(12) United States Patent
Numata

(10) Patent No.: US 6,346,971 B1
(45) Date of Patent: Feb. 12, 2002

(54) PICTURE SYNTHESIZING SYSTEM INCLUDES A COLOR TABLE CONVERSION SECTION

(75) Inventor: Kohji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,617

(22) Filed: Nov. 15, 1999

(30) Foreign Application Priority Data

Nov. 19, 1998 (JP) .......................................... 10-329919

(51) Int. Cl.⁷ .......................... H04N 5/445; H04N 9/74; H04N 5/45
(52) U.S. Cl. ..................... 348/564; 348/565; 348/566; 348/588; 348/599
(58) Field of Search ................................. 348/563, 564, 348/565, 566, 567, 568, 584, 588, 598, 599; H04N 5/445, 5/45, 9/74, 9/76

(56) References Cited

U.S. PATENT DOCUMENTS 6,115,080 A * 9/2000 Reitmeier ................... 348/564

* cited by examiner

*Primary Examiner*—Sherrie Hsia
(74) *Attorney, Agent, or Firm*—Scully, Scott, Murphy & Presser

(57) ABSTRACT

A picture synthesizing system includes a main picture decoding section, sub-picture decoding section, color table conversion section, sub-picture data conversion section, and picture synthesizing section. The main picture decoding section decodes main picture data by a first picture compression scheme. The sub-picture decoding section outputs a color table and frame data by decoding sub-picture data by a second picture compression scheme. The color table conversion section converts the color table from the sub-picture decoding section on the basis of a display format in which a synthesized picture is displayed. The sub-picture data conversion section converts the frame data from the sub-picture decoding section. The picture synthesizing section generates sub-picture data first on the basis of the color table and frame data output from the color table conversion section and sub-picture data conversion section, and then synthesizes the sub-picture data with the main picture data output from the main picture decoding section.

7 Claims, 6 Drawing Sheets

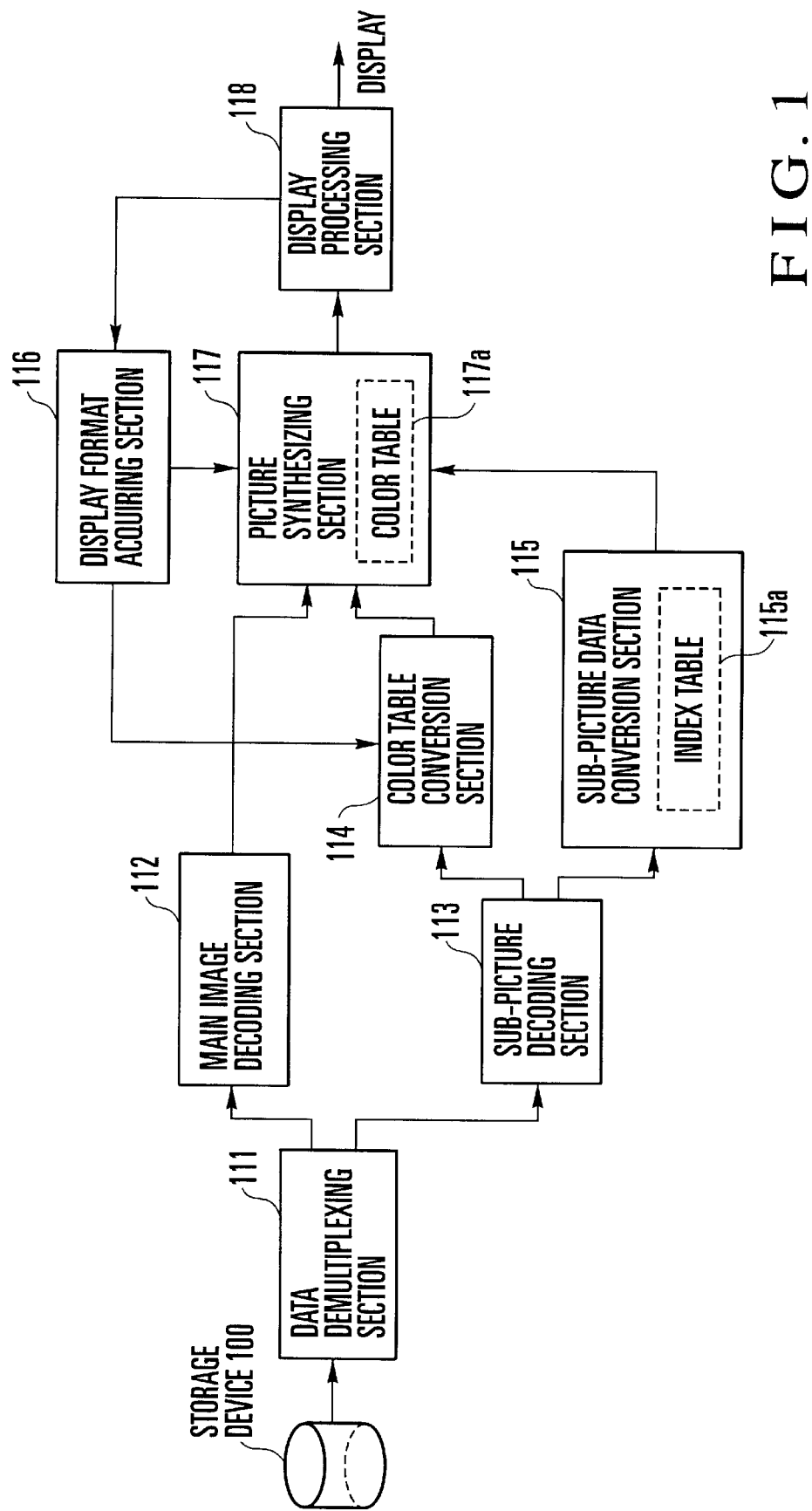
F I G. 1

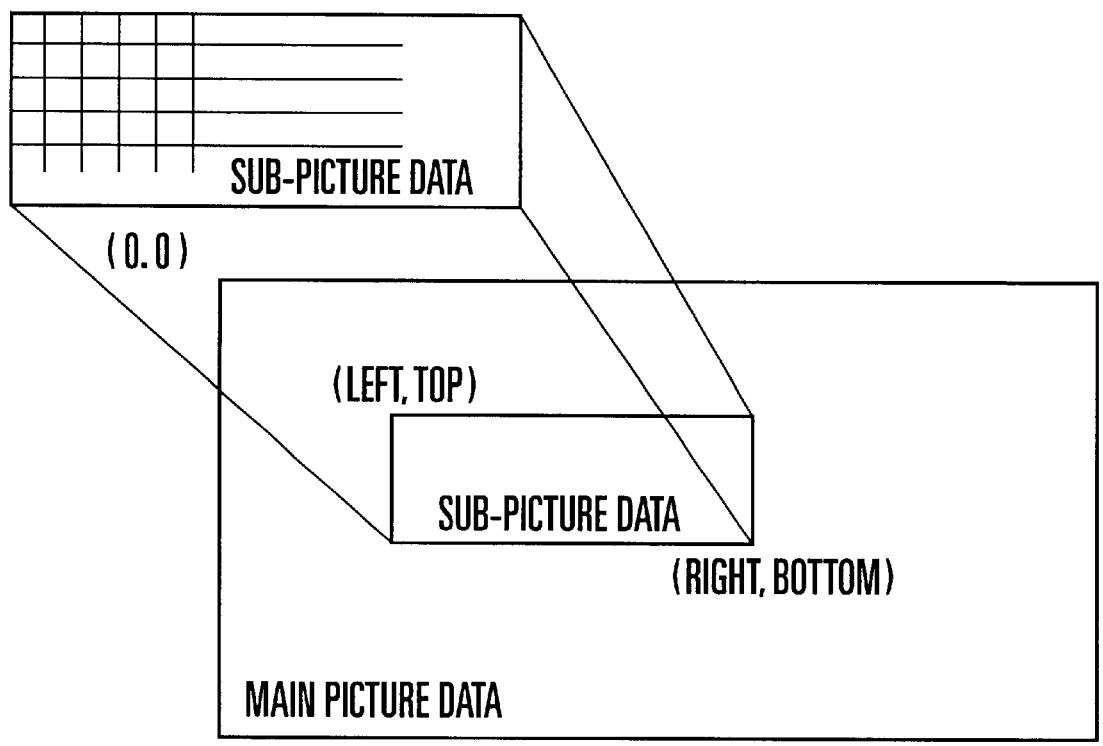
F I G. 2

| | | | | | | | | | | |
|---|---|---|---|---|---|---|---|---|---|---|
| 0 | 0 | 0 | 0 | 0 | 0 | 0 | | | | |
| 0 | 1 | 1 | 1 | 1 | 1 | 0 | | | | |
| 0 | 1 | 1 | 2 | 2 | 2 | 1 | 0 | | | |
| | | | | | | | | | | |
| 0 | n-1 | n-1 | n-1 | n-1 | n-1 | n-1 | 0 | | | |
| | | | | | | | | | | |
| 0 | 0 | 0 | 0 | 0 | 0 | 0 | | | | |
| | | | | | | | | | | |
| | | | | | | | | | | |

SUB-PICTURE FRAME DATA

FIG. 3A

| PIXEL DATA | COLOR INDEX | CONTRAST |
|---|---|---|
| 0 | | |
| 1 | | |
| 2 | | |
| ~ | | |
| n-1 | | |

115a

INDEX TABLE

FIG. 3B

| COLOR INDEX | Y | U | V |
|---|---|---|---|
| INDEX 0 | | | |
| INDEX 1 | | | |
| INDEX 2 | | | |
| ~ | | | |
| INDEX m-1 | | | |

117a

COLOR TABLE

FIG. 3C

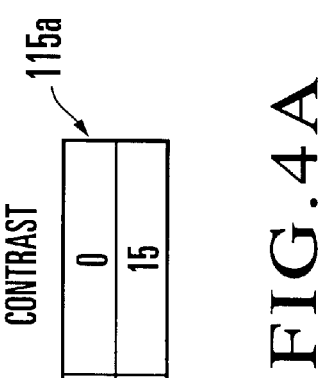
FIG. 4A
FIG. 4B
FIG. 4C

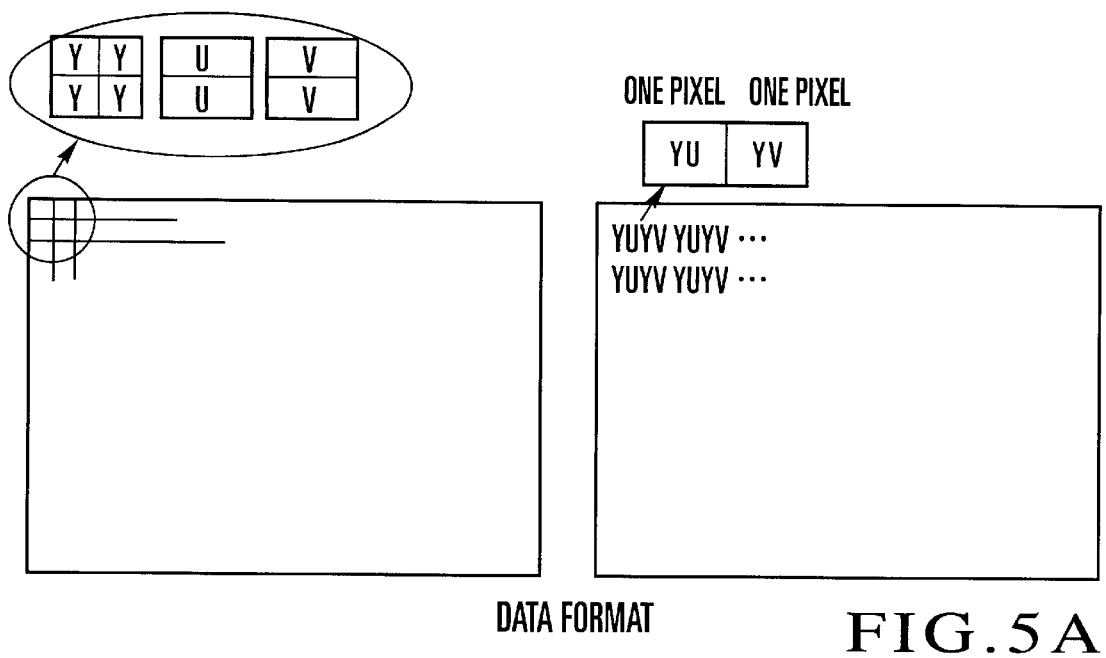

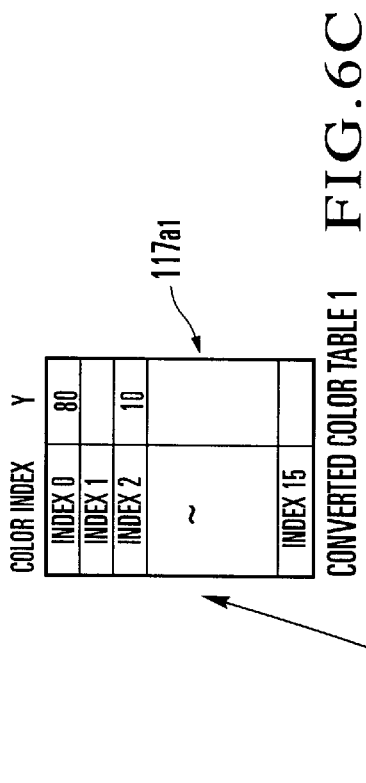
FIG. 6C
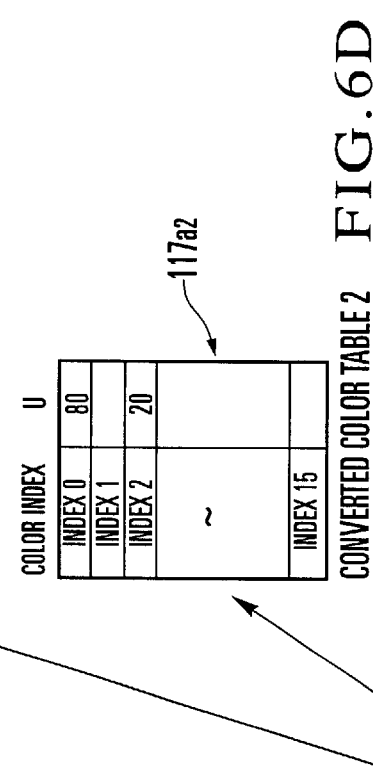
FIG. 6D
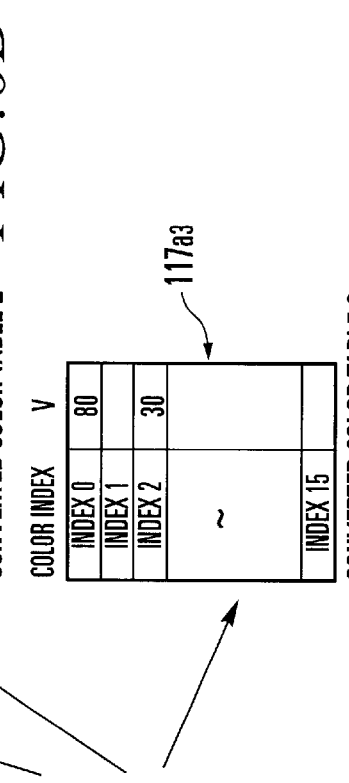
FIG. 6E
FIG. 6A
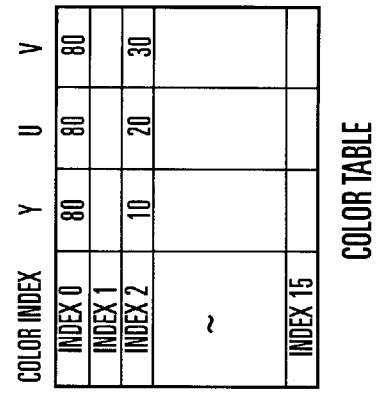
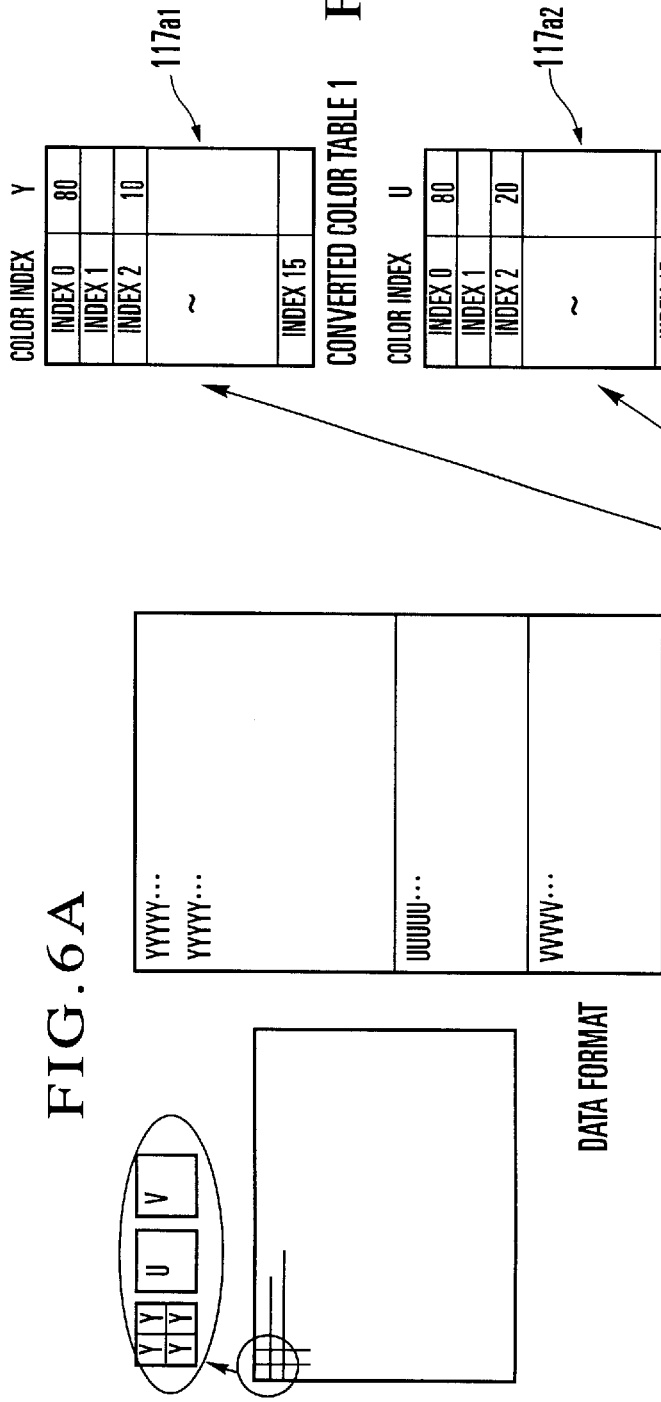
FIG. 6B

PICTURE SYNTHESIZING SYSTEM INCLUDES A COLOR TABLE CONVERSION SECTION

BACKGROUND OF THE INVENTION

The present invention relates to a picture synthesizing system and, more particularly, to a picture synthesizing system for synthesizing main picture data compressed by the MPEG (Moving Picture coding Experts Group, ISO/IEC) scheme with sub-picture data such as subtitles compressed by the run-length scheme.

Recently, a system for decoding and synthesizing main picture data compressed by the MPEG scheme and sub-picture data such as subtitles on a movie or karaoke video, and playing back the resultant data has been proposed. In such a system, when MPEG decoding, run-length decoding, and synthesis processing are to be processed by software, a sub-picture data conversion section performs format conversion of sub-picture data, but color palette conversion is not performed.

In this case, however, in synthesis processing, YUV data (Y: luminance signal; U and V: color difference signals) must be rearranged in accordance with a display format by looking up a table. This increases the load on the CPU (Central Processing Unit).

SUMMARY OF THE INVENTION

It is an object of the present invention to provide a picture synthesizing system which attains a reduction in processing load by eliminating the necessity to rearrange YUV data in synthesis processing for main picture data and sub-picture data.

In order to achieve the above object, according to the present invention, there is provided a picture synthesizing system comprising first decoding means for decoding main picture data by a first picture compression scheme, second decoding means for outputting a color table and frame data by decoding sub-picture data by a second picture compression scheme, first conversion means for converting the color table from the second decoding means on the basis of a display format in which a synthesized picture is displayed, second conversion means for converting the frame data from the second decoding means, and picture synthesizing means for generating sub-picture data first on the basis of the color table and frame data output from the first and second conversion means, and then synthesizing the sub-picture data with the main picture data output from said first decoding means.

BRIEF DESCRIPTION OF THE DRAWINGS

FIG. 1 is a block diagram showing a picture synthesizing system according to an embodiment of the present invention;

FIG. 2 is a conceptual view for explaining picture synthesis processing for main picture data and sub-picture data;

FIGS. 3A to 3C are views for respectively explaining sub-picture frame data after run-length decoding, an index table, and a color table;

FIGS. 4A to 4C are views for respectively explaining an index table and sub-picture frame data before and after conversion;

FIGS. 5A to 5D are views for explaining color table conversion when picture display is to be performed according to the YUV422 format; and FIGS. 6A to 6E are views for explaining color table conversion when picture display is to be performed according to the YUV420 format.

DESCRIPTION OF THE PREFERRED EMBODIMENT

The present invention will be described in detail below with reference to the accompanying drawings.

FIG. 1 shows a picture synthesizing system according to an embodiment of the present invention. As shown in FIG. 1, a picture synthesizing system of the present invention is comprised of a storage device 100, a data demultiplexing section 111 for receiving an output from the storage device 100, a main picture decoding section 112 and sub-picture decoding section 113 for respectively receiving demultiplex outputs from the data demultiplexing section 111, a color table conversion section 114 and sub-picture data conversion section 115 for respectively receiving two outputs from the sub-picture decoding section 113, a display format acquiring section 116 for outputting a signal to the color table conversion section 114, a picture synthesizing section 117 for respectively receiving outputs from the main picture decoding section 112, color table conversion section 114, sub-picture data conversion section 115, and display format acquiring section 116, and a display processing section 118 for receiving an output from the picture synthesizing section 117 and outputting a signal to the display format acquiring section 116.

The storage device 100 stores multiplex data obtained by multiplexing main picture data compressed/coded by the MPEG scheme with sub-picture data such as subtitles on a movie or karaoke video compressed/coded by the run-length scheme.

The data demultiplexing section 111 demultiplexes multiplex data read out from the storage device 100 into compressed main picture data and compressed sub-picture data. The demultiplexed compressed main picture data is output to the main picture decoding section 112. The compressed sub-picture data is output to the sub-picture decoding section 113.

The main picture decoding section 112 decodes the main picture data compressed/coded by the MPEG scheme and supplied from the data demultipiexing section 111 and outputs the resultant data to the display format acquiring section 116.

The sub-picture decoding section 113 decodes the sub-picture data compressed/coded by the run-length scheme and supplied from the data demultiplexing section 111. The sub-picture decoding section 113 then outputs the color table to the color table conversion section 114 and also outputs the sub-picture frame data to the sub-picture data conversion section 115.

The color table conversion section 114 converts the color table from the sub-picture decoding section 113 in accordance with the display format from the display format acquiring section 116, and outputs the converted color table to the picture synthesizing section 117.

The sub-picture data conversion section 115 performs format conversion of the run-length-decoded sub-picture data from the sub-picture decoding section 113, and output s the resultant data to the picture synthesizing section 117. The sub-picture data conversion section 115 has an index table 115a (to be described later).

The picture synthesizing section 117 synthesizes the main picture data from the main picture decoding section 112 with the sub-picture data generated on the basis of the sub-picture data conversion section 115 and color table conversion section 114 by the YUV scheme in accordance with the display format from the display format acquiring section 116. The picture synthesizing section 117 then outputs the resultant data to the display processing section 118. The picture synthesizing section 117 has a color table 117a (to be described later).

The display processing section 118 performs display processing on the basis of the output from the picture synthesizing section 117, and outputs the display format to the display format acquiring section 116. The display format acquiring section 116 acquires the display format form the display processing section 118, and outputs the acquired display format to the color table conversion section 114 and picture synthesizing section 117.

FIG. 2 shows picture synthesis processing in the picture synthesizing section 117. As shown in FIG. 2, sub-picture data is synthesized at the synthesis position "left, top", "right, bottom" designated on a main picture.

FIGS. 3A to 3C respectively show sub-picture data after run-length decoding, an index table, and a color table. As indicated by the sub-picture data in FIG. 3A, each decoded pixel has either the value "0" or the value "n−1".

As shown in FIGS. 3B and 3C, look-up tables for contrast information and color information for each pixel respectively include the index table 115a and color table 117a. The index table 115a is used to designate a color index indicating how many colors of a maximum of m colors are used for each pixel data of n values and a contrast indicating a synthesis ratio. The color table 117a is used to designate color information (Y, U, V) for each color index.

Assume that contrast information and color information for each pixel after run-length decoding are designated by the two tables in this manner. In this case, if the picture synthesizing section 117 performs synthesis processing according to the data format without any change, the two tables must be looked up to acquire YUV data for one pixel, resulting in cumbersome operation. To solve this problem, only the index table is looked up for each pixel after run-length decoding to perform format conversion of frame data, and the resultant data is output to the picture synthesizing section 117.

FIGS. 4A to 4C respectively show an index table, sub-picture data, and format after conversion. Assume that sub-picture data after run-length decoding is binary pixel data, the color data takes a maximum of 16 colors, and the contrast takes the values "0" to "15".

If the value of pixel data after run-length decoding is "0", the value of the color index is "0", and the contrast value is "0", as shown in FIGS. 4A and 4B. As shown in FIG. 4C, therefore, in the converted pixel data, "0000b" indicating a color index is inserted in the upper four bits, and "0000b" indicating a contrast value is inserted in the lower four bits.

Likewise, if the value of pixel data is "1", the value of the color index is "2", and the contrast value is "15, as shown in FIGS. 4A and 4B. As shown in FIG. 4C, therefore, in the converted pixel data, "0010b" indicating a color index is inserted in the upper four bits, and "1111b" indicating a contrast value is inserted in the lower four bits.

In this manner, the pixel data after run-length decoding are converted into 8-bit data each corresponding to one pixel and indicating a color index value and contrast value, and the data are output to the picture synthesizing section 117.

The picture synthesizing section 117 synthesizes the sub-picture with the main picture by using the converted sub-picture frame data and the color table 117a. In this case, the format used for synthesis processing depends on the format displayed by the display processing section 118. The display format acquiring section 116 therefore acquires the current display format from the display processing section 118 and outputs it to the color table conversion section 114 and picture synthesizing section 117.

In accordance with the display format from the display format acquiring section display format acquiring section 116, the color table conversion section 114 converts the color table decoded by the sub-picture decoding section 113. The picture synthesizing section 117 performs picture synthesizing operation in accordance with the display format from the display format acquiring section 116.

FIGS. 5A to 5D show an example of color table conversion. This example is color table conversion for the format displayed by the display processing section 118, in which each of the color difference signals U and V corresponds two pixels whereas the luminance signal Y corresponds to four pixels (this format is generally called YUV422 format), and the signals Y, U, and V are packed in units of pixels, as shown in FIG. 5A.

The color table decoded by the sub-picture decoding section 113 has the format shown in FIG. 5B, in which each color information (Y, U, V) is designated by a color index. Assume that the color table shown in FIG. 5B is used without any change when the format displayed by the display processing section 118 assigns only 2-pixel data to each of the signals U and V while assigning 4-pixel data to the signal Y, as shown in FIG. 5A. In this case, 3-byte data, i.e., Y, U, and V data, must be loaded to acquire 1-pixel data. In addition, the loaded data must be rearranged.

For this reason, when display operation is to be performed according to the format in FIG. 5A, the operation can be efficiently performed by converting the color table into the format shown in FIGS. 5C and 5D. With the use of color tables 117a1 and 117a2 in FIGS. 5C and 5D, 1-pixel data can be acquired by loading only 2-byte data, i.e., Y and U data or Y and V data. In addition, the loaded data need not be rearranged.

FIGS. 6A to 6E show another example of color table conversion. This example is color table conversion for the format displayed by the display processing section 118, in which each of the color difference signals U and V corresponds only one pixel whereas the luminance signal Y corresponds to four pixels (this format is generally called YUV420 format), and each of 1-frame Y, Y, and V data is continuously stored, as shown in FIG. 6A.

The color table decoded by the sub-picture decoding section 113 has the format shown in FIG. 6B, in which each color information (Y, U, V) is designated by a color index. Assume that the color table shown in FIG. 6B is used without any change when the format displayed by the display processing section 118 has the Y, U, and V data written in different areas, as shown in FIG. 6A. In this case, 3-byte data, i.e., Y, U, and V data, must be loaded to acquire 1-byte data. In addition, if the Y, U, and V frame data are loaded, the data in the table become discontinuous, resulting in a decrease in loading efficiency in the CPU.

For this reason, when display operation is to be performed according to the format in FIG. 6A, the operation can be efficiently performed by converting the table into the format shown in FIGS. 6C to 6E. With the use of color tables 117a1 and 117a3 in FIGS. 6C to 6E, 1-pixel data can be acquired by loading only 1-byte data, i.e., Y, U, or V data. In addition, the Y, U, V frame data can be efficiently loaded because the data in the table are continuous.

The picture synthesizing section 117 generates sub-picture data from the sub-picture frame data from the sub-picture data conversion section 115 by looking up the color table converted by the color table conversion section 114, and then performs YUV synthesis of the sub-picture data and main picture data.

According to the present invention described above, the load of synthesis processing can be reduced when still pictures such as subtitles on a movie or karaoke video are synthesized with moving pictures.

The first reason is that the number of times a table is looked up in picture synthesis processing can be decreased by converting pixel data of n values after run-length decoding into pixel data containing color information and contrast information, and transferring the resultant data to the picture synthesizing section.

The second reason is that the structure of a color table is converted in accordance with a display format to eliminate the necessity to rearrange YUV data in color table look-up operation, and unnecessary data need not be loaded.

What is claimed is:

1. A picture synthesizing system comprising:
    first decoding means for decoding main picture data by a first picture compression scheme;
    second decoding means for outputting a color table and frame data by decoding sub-picture data by a second picture compression scheme;
    first conversion means for converting the color table from said second decoding means on the basis of a display format in which a synthesized picture is displayed;
    second conversion means for converting the frame data from said second decoding means; and
    picture synthesizing means for generating sub-picture data first on the basis of the color table and frame data output from said first and second conversion means, and then synthesizing the sub-picture data with the main picture data output from said first decoding means.

2. A system according to claim 1, wherein said first conversion means converts the color table into YU and YV color tables for acquiring YU data and YV data when the display format is a YUV422 format in which four pixels are assigned to a luminance signal Y while only two pixels are assigned to each of color difference signals U and V, and the signals Y, U, and V are stored in the order of Y, U, Y, and V.

3. A system according to claim 1, wherein said first conversion means converts the color table into Y, U, and V color tables for acquiring Y data, U data, and V data when the display format is a YUV420 format in which four pixels are assigned to a luminance signal Y while only one pixel is assigned to each of color difference signals U and V, and each of Y, U, and V is stored in units of frames.

4. A system according to claim 1, wherein the first picture compression scheme is a moving picture coding experts group (MPEG) compression coding scheme, and the second picture compression scheme is a run-length compression coding scheme.

5. A system according to claim 1, wherein said second conversion means performs frame conversion of the sub-picture data from said second decoding means by using an index table.

6. A system according to claim 1, wherein said system further comprises:
    display processing means for performing display processing for synthesized picture data output from said picture synthesizing means; and
    format acquisition means for acquiring a display format of the synthesized picture data from said display processing means, and
    said first conversion means and said picture synthesizing means perform converting operation and synthesizing operation on the basis of the display format from said format acquisition means.

7. A system according to claim 1, further comprising data demultiplexing means for demultiplexing an input signal into main picture data based on the first picture compression scheme and sub-picture data based on the second picture compression scheme, and outputting the data to said first and second decoding means.

* * * * *